US006994001B2

(12) United States Patent
Krukov

(10) Patent No.: US 6,994,001 B2
(45) Date of Patent: Feb. 7, 2006

(54) DEVICE TO PRODUCE ROUND CROSS-SECTION ARTICLES WITH COMPLICATED PROFILED SURFACES

(75) Inventor: Alexandr Ivanovich Krukov, St.-Petersburg (RU)

(73) Assignee: Technology Commercialization, Inc., New York, NY (US)

( * ) Notice: Subject to any disclaimer, the term of this patent is extended or adjusted under 35 U.S.C. 154(b) by 46 days.

(21) Appl. No.: 10/781,008

(22) Filed: Feb. 18, 2004

(65) Prior Publication Data

US 2004/0226155 A1    Nov. 18, 2004

Related U.S. Application Data

(63) Continuation-in-part of application No. PCT/RU02/00393, filed on Aug. 21, 2002.

(30) Foreign Application Priority Data

Aug. 21, 2001  (RU) .................................... 20873

(51) Int. Cl.
*B23B 3/26*    (2006.01)

(52) U.S. Cl. ....................... 82/11; 82/131; 409/165; 409/132; 142/37; 142/40; 142/41

(58) Field of Classification Search ................ 82/11, 82/1.11, 12, 131; 409/165, 166, 168, 237; 142/9, 21, 37, 40, 41; B23B 3/26
See application file for complete search history.

(56) References Cited

U.S. PATENT DOCUMENTS

| | | | | |
|---|---|---|---|---|
| 1,540,801 A | * | 6/1925 | O'Neel | 142/37 |
| 2,326,066 A | * | 8/1943 | Robinson | 142/40 |
| 3,204,671 A | * | 9/1965 | Schoenrock | 142/7 |
| 3,512,561 A | * | 5/1970 | Cortez | 142/37 |
| 3,768,527 A | * | 10/1973 | Messick | 142/38 |
| 4,227,557 A | * | 10/1980 | Allen | 142/7 |
| 4,588,005 A | * | 5/1986 | Sliker | 142/7 |
| 4,627,477 A | * | 12/1986 | Wise | 142/7 |

FOREIGN PATENT DOCUMENTS

| | | |
|---|---|---|
| DE | 4216763 | 11/1993 |
| FR | 2600580 | 12/1987 |
| RU | 20873 | 12/2001 |
| SU | 1020233 | 5/1983 |
| SU | 1653954 | 6/1991 |
| WO | WO 03/020480 | 3/2003 |

* cited by examiner

*Primary Examiner*—Boyer D. Ashley
*Assistant Examiner*—Sara Addisu
(74) *Attorney, Agent, or Firm*—Boris Leschinsky

(57) ABSTRACT

A lathe attachment device is disclosed for producing long articles with complicated profiles. The device contains a beveled multi-teeth cutter driven to rotate in a direction opposite the rotation of a billet to ensure a very short period of contact time between an individual cutting tooth and the article. The cutter is slightly tilted towards the billet in both horizontal and vertical plane. The teeth of the cutter are shaped to each have a pointed end facing the rough part of the billet. Provisions are made to draw the cutter along the billet. The device allows producing a smooth finished long article with complicated surface profile in a single pass with high productivity. Due to limited contact time, it offers extended life of the cutter. The device is used most advantageously to produce long wood articles.

9 Claims, 2 Drawing Sheets

Fig. 4 Fig. 5
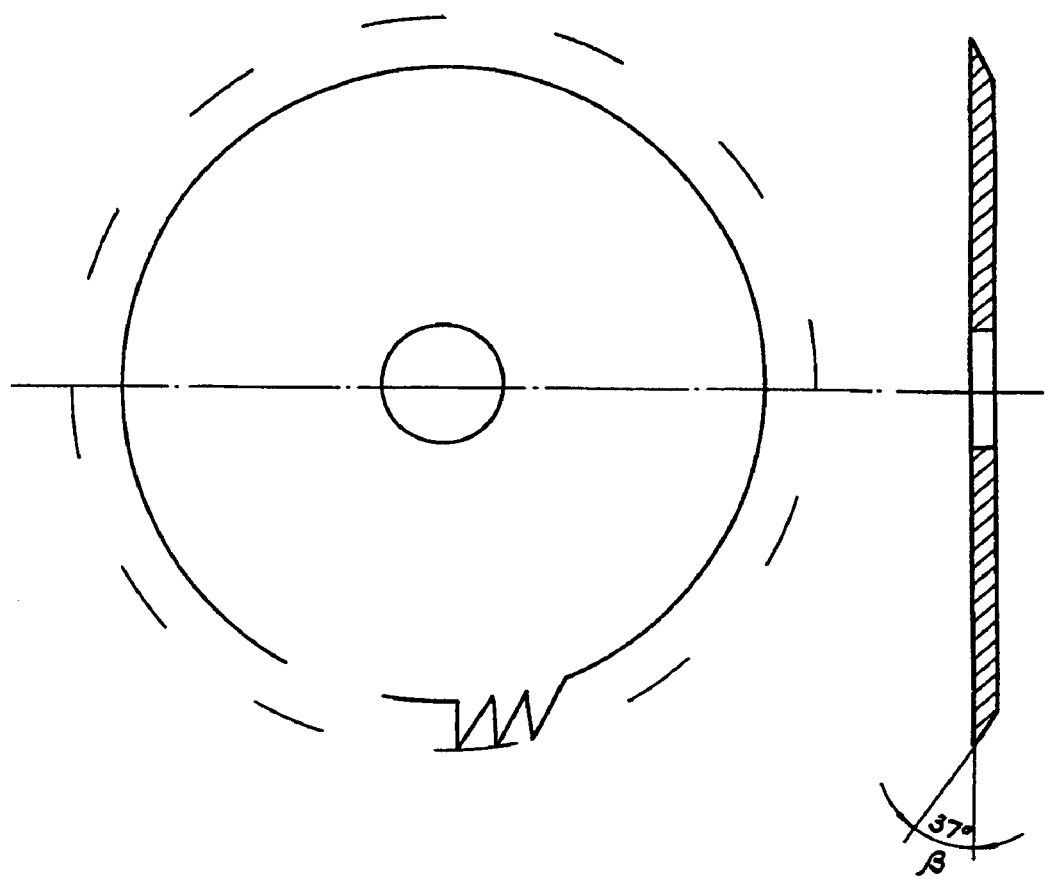
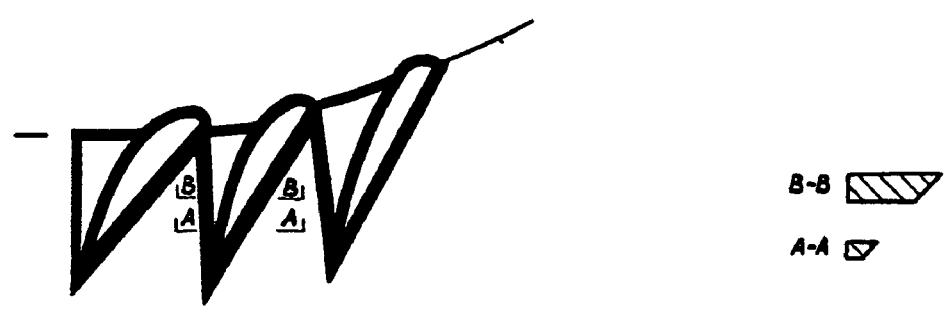
Fig. 6 Fig. 7

DEVICE TO PRODUCE ROUND CROSS-SECTION ARTICLES WITH COMPLICATED PROFILED SURFACES

CROSS-REFERENCE DATA

This application is a continuation-in-part of a PCT application No. PCT/RU02/00393 with the same title filed 20 Aug. 2002, which in turn claims priority from a patent application of the Russian Federation No. 2001123379 filed 21 Aug. 2001.

BACKGROUND OF INVENTION

The present invention relates generally to the field of lathes and mechanical processing of long, semi-rigid shafts (billets). More particularly, the device of the invention may be used advantageously as an attachment to a lathe to produce round cross-section articles with complicated profiled surfaces out of wood and other materials, including plastic, metal and composites. The instant invention should preferably be used to process wood workpieces.

Lathes equipped with automatic copying attachments are generally known. Russian Patent No. 338367 describes for example a profile turning automatic lathe allowing to make articles of round cross-section having complicated profiled surfaces. A rotating billet (typically with a square or round cross-section) is placed in the lathe and is processed with the help of several separate cutters moving in the plane of the billet's rotation axis. Rough and finishing cutters are fixed in the turning saddle and drawn along the main saddle in two directions: parallel to the billet's axis and radial or perpendicular to it. In the latter case the distance between the edge of the finishing cutter and the billet's axis is regulated with the help of a copying unit consisting of a copier (template) to which a guide roller (connected in turn with the turning saddle) is pressed with a spring. To process certain fine detail parts characterized by small radii of curvature, additional shaper tools are used: their edges correspond to the configuration of each separate section of the part. These shaper tools perform only cross-section turning and billet's cutting according to the required size. Cross-section cutters are set in working motion by turning, while the main saddle of the lathe moves using corresponding oscillating levers.

The shortcomings of this processing device include low productivity, the necessity of using a guide roller on the template (which results in limitations when processing profiled articles with small curvature radii), difficulty with cutting when heavy radial loads are imposed on the billet, a need for complicated readjustment when producing a new configuration of articles having different shapes and hardness, and a relatively short durability period of single-toothed tools of varied nomenclature.

These types of lathes, as well as planer tools having no additional shaper tools are already utilized in industry, such as TDS-2 (Russia), T-1500 (Italy) and others.

There is known a method of processing cylindrical billets using multi-toothed machining tools, as described in Russian Federation Patent No. 2064406. These tools are assembled in a form-milling cutter with two or more flat chisels held rigidly together so that wide enough edges are positioned in a common plane along the form-milling cutter's radii. This multi-teeth machining tool is rotated around the axis perpendicularly to the axis of the billet's rotation and is drawn along the billet's axis. This lathe's disadvantage is the inability to process complicated curved surfaces. It is possible only to change the diameter of the billet's machined surface to some extent while moving the tool along the billet's axis. Also, the cutting action power requirement increases in proportion to the width of the contact edge.

According to the Russian Patent No. 1653954, there is disclosed a lathe for processing articles as bodies of rotation where form-milling cutters with wide edges of various curvature are used instead of shaper tools. While processing profiled surfaces, a form-milling cutter is placed strictly perpendicular to the tangent of the curved surface. The device requires a complex mechanism of turning the form-milling cutter due to the introduction of an additional copier while the main saddle is moved lengthwise along the major copier. Each section of a billet with a different shape requires having another form-milling cutter of convex or concave edge as well as corresponding adjustment of the copier. The machined workpieces' curvature cannot be less than that of the corresponding form-milling cutter. The disadvantage of this processing method is its low productivity due to the inability to increase the number of complicated profiled teeth within the form-milling cutter's limited diameter; the necessity to use a complex copying assembly with two guide rollers; and the need for a mechanism for constant readjusting of the slope angle of the form-milling cutter, while processing selected sections of a workpiece. Additionally, the necessity of changing form-milling cutters to process parts with profiles having small curvature radii as well as the complicated adjustment procedure of the lathe and having to use expensive form-milling cutters reduce further the attractiveness of the device. Finally, a wide form-milling cutter causes decreased productivity due to billet's heavy radial loads.

Another similar device intended for processing articles as bodies of rotation is described in the Russian Patent No. 1653954 incorporated herein by reference.

The need therefore exists for a device adapted for efficient high-productivity manufacture of long articles (made of wood, metal, plastic, composites, etc.) having complicated curved surfaces.

SUMMARY OF THE INVENTION

Accordingly, it is an object of the present invention to overcome these and other drawbacks of the prior art by providing a novel lathe attachment device to produce a long-profiled article with small curvature radii.

It is a further object of the present invention to provide a device to produce a long-profiled article with the ratio of their length to average diameter of up to 30:1 or more.

It is yet a further object of the present invention to provide a lathe attachment device to produce a long-profiled article in a single transverse pass and with high accuracy.

It is yet a further object of the present invention to provide a device to produce a long-profiled article with high productivity.

The device of the invention uses a specially sharpened narrow form-milling cutter as a multi-teeth machining tool. This rotating cutter is mechanically drawn along the billet, which typically has a square or round cross-section. The cutter is also independently moved radially towards and away from the billet with the help of a main saddle. The saddle is designed in the form of a balancing unit, which has two degrees of freedom to move relative to the cylinder guide. It should be noted that a friction fixation coupler is used for support of the saddle. It consists of a slider bearing moving over and along the sleeved cylinder guide.

A cutter spindle is positioned in two orthogonal planes at acute angles to the main axis of a workpiece. The specially sharpened form-milling cutter is rotated in the opposite direction to the billet. Therefore, the cutter cuts the billet with the tip edges of its multi-edged acutely-shaped teeth, thus in turn only the few auxiliary edges facing the rough section of a billet (and only at the teeth tops) come in contact with the billet at each given point in time. This ensures minimal radial load on the billet and a high level of smoothness of the finished work surfaces, and also results in allowing the depth of the cut layer not to depend much on the teeth height of the milling cutter.

BRIEF DESCRIPTION OF THE DRAWINGS

A more complete appreciation of the subject matter of the present invention and the various advantages thereof can be realized by reference to the following detailed description in which reference is made to the accompanying drawings in which:

FIG. 4 is a side view of the form-milling cutter;

FIG. 5 is a cross-sectional side view of the form-milling cutter;

FIG. 6 is a cross-sectional view of the teeth of the cutter as seen from the side opposite to the workpiece cutting edge; and FIG. 7 is showing two cross-section views of the cutter tooth as indicated.

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 1:
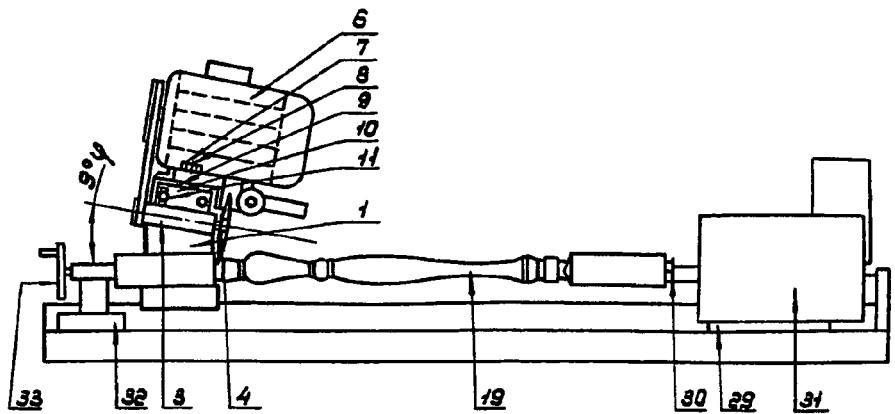
FIG. 1 is a front view of the attachment device of the present invention placed on the generic lathe. Illustrated is the processing step of a long-sized workpiece with round cross-section and curved surface at the final stage of preparation.
Figure 2:
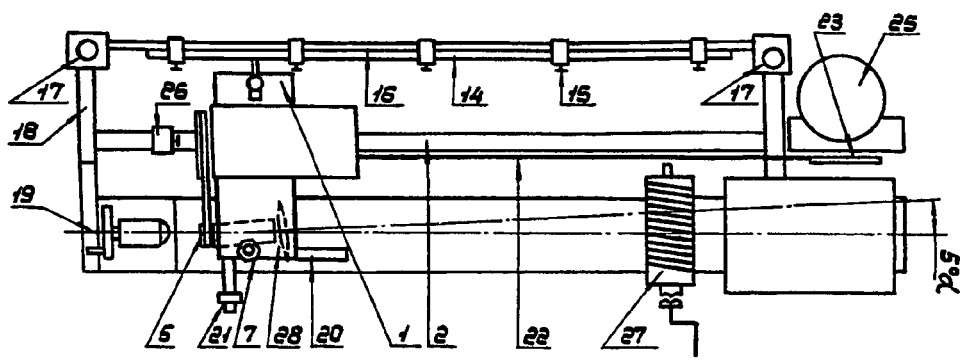
FIG. 2 is a top view of the attachment device (the lathe is shown without the billet)
Figure 3:
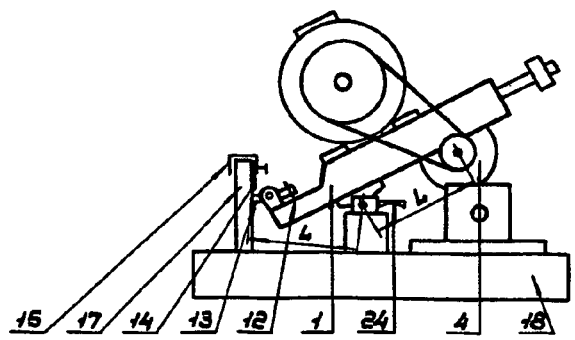
FIG. 3 shows the side view of the attachment device of the invention.

The attachment device is shown in detail on FIGS. 1, 2 and 3 and consists of the main saddle comprising a balancing unit 1 having two degrees of freedom to move relative to a cylinder guide 2. The balancing unit 1 carries a cutter spindle 3 with multi-teeth machining cutter 4 on slider bearings along the cylinder guide 2.

The cutter spindle 3 is rotated by means of drive belt 5 powered by an electric motor 6 fixed onto the balancing unit 1. It is possible to place the motor shaft and the cutter spindle coaxially if that is preferred. This way, the center of gravity of the balancing unit 1 is positioned above the cylinder guide 2. The cutter spindle 3 is fixed onto the balancing unit 1 and can move in two orthogonal planes (vertical and horizontal) at small acute angles $\alpha$ and $\phi$ to the axis of the cylinder guide 2. The value of acute angles $\alpha$ and $\phi$ may be optionally permanently fixed, (for example for processing billets of certain wood types) by welding a bearing body with a box-like balancing unit's structure. Alternatively, a dedicated adjustment mechanical means can also be used, which makes it possible to vary the cutter spindle's angles depending on the type of wood (or other material) being processed.

In this case, the cutter spindle is set at predetermined angle $\alpha$ in the horizontal plane with nut 7, which limits the rotation of that special mechanical means around the balancing unit's box. The special mechanism consists further of a pin 8 welded to a flange 9. Another flange 10 welded to the bearing body of the cutter spindle moves vertically around flange 9 at a predetermined angle $\phi$. Flange 10 is fixed relative to the flange 9 with bolts 11 coming through the corresponding slots in the flange 10.

A copier pin 13 protrudes upwards and rests against template copier 14, which in turn is set on the opposite side of the balancing unit 1. The angle adjustment can be performed with a screw lever 12. A copier (such as a template) is essentially a "half-profile" of the desired article's longitudinal section made of hard material, for example, acrylic. In some cases, it is possible to use an original finished piece instead of a copier template to obtain a limited number of duplicate copies. A copier is fastened to a supporting slat 16 with easy to remove screw-type clamps 15. The supporting slat therefore is able to be moved vertically along the two guiding lines 17, which in turn are perpendicular to the cylinder guide 2. They are joined to it rigidly by a frame 18 at a distance equal to that from the axis of the cylinder guide 2 to the center of multi-teeth cutting tool 4. The frame 18 can be made universal to join the suggested device to any lathe's frame (either by welding, or with bolts and brackets) so that the center of the multi-teeth tool is placed directly above the axis of workpiece 19.

The balancing unit handle 20 is fixed in the front part of the balancing unit 1 and is intended to allow the operator to set the multi-toothed cutting tool to start working on the billet by turning the balancing unit 1 around the axis of cylinder guide 2. In that case, the center of gravity of the balancing unit 1 shifts towards the billet being processed. Counterweights 21 are intended to shift the center of gravity of the balancing unit 1 and to help distribute loads between the billet and copier 14 in the operating mode, thus minimizing the copier's load upon the billet. The copier's pin 13 may be made of rather small diameter rod or a narrow rigid plate about 1 mm thick and it does not need a slider bearing. That makes it possible to copy parts with small curvature profiles.

The balancing unit 1 moves lengthwise along the cylinder guide 2, being pulled by a chain 22 attached to a reduction gearbox 23 through a release gear 24. The reduction gearbox 23 is powered by an electric motor 25 attached to the frame 18. A chain with weights or a manually rotated wheel driving a gear may be optionally used instead of a chain with a motorized drive.

In the preferred mode, all of the drive motors of the device are turned off when the balancing unit 1 reaches and presses the end switch 26 after the billet has been completely processed lengthwise. The balancing unit 1 is then raised by the hand by pulling on lever 20 and release gear 24 disengages the chain 22, so that the balancing unit 1 can be returned along the cylinder guide to its initial position by hand. This return to the initial position may also be performed by way of an additional drum with a rope 27 set on frame 18. All of these described processes may be easily automated and/or mechanized as may be appreciated by those skilled in the art.

The balancing unit 1 has the form of a box, having separate elements 28 covering the cutting tool from the top and from the front to protect operators from accidental injuries. Preferably, there is a hose at the back of the balancing unit to carry shavings away from the device's cutting area to a collection device. FIG. 1 does not show these elements, although FIG. 2 reveals the cutting tool's protecting element 28 and nut 7, which fixes a special mechanism for arranging α and φ angles of the cutter spindle.

Alternatively, the device of the invention may be powered by the main motor of the lathe. In that case, the lathe contains a drive head 29 with a pinned guide head 30, which transfers the torque from engine's shaft 31 to the processed billet 19. A dummy head 32 equipped with a flywheel 33 and adapted to clamp the billet between the centers is placed on the frame of the lathe. The attachment device of the invention may be then joined to the frame of the lathe, which has already the necessary elements to position and rotate a billet. It is possible then to fix the balancing unit 1 right on the turning saddle of the lathe, in which the turning saddles move lengthwise on a drive. In this case, the cylindrical guide 2 with a slider bearing can be replaced by a short simple axis with a roller bearing.

The shaping and preparation of the beveled cutter 4 is now described in greater detail. One can start with a milling tool for cutting that is commonly utilized in the metalworking industry. It is essentially a disk, preferably 100–120 mm in diameter and up to 2 mm thick. The disk has a number of triangular teeth as shown on FIG. 4 through FIG. 7. A bevel is made on one side of the cutter at preferably lower acute angle β to the milling cutter's plane (shown as 37 degrees on FIG. 5). The bevel defines a cutting side with the greatest diameter (left side on FIG. 5). This side is entirely flat and oriented to face the rough portion of the billet to be cut. Each tooth of the cutter has therefore a cutting edge along the flat surface of the cutting side of the cutter terminated in a pointed end. Each tooth is additionally sharpened on the other side of the cutter along its height and width. A very sharp pointed end of the milling cutter tooth is therefore formed to have a thickness reduced practically to zero at the very tip, on the side where the milling cutter's plane has the greatest diameter, and facing the rough part of the billet during its processing. It is these sharp pointed ends that do all the cutting of the billet during the processing of the article.

All the teeth are shaped so that their top cross-sections may have a triangular form or a trapezoidal form, one of its sides being perpendicular (or, given some curvature, being essentially perpendicular) to the base and another resting against the edge at an acute angle. Given the curved nature of the sharpening tools (and their operation) preferably used to form (and sharpen) the faces of the cutter teeth, all referenced cutter teeth edges and faces may have some curvature, at the same time generally maintaining their triangular or trapezoidal cross-sectional shape.

Sharpening the teeth of milling cutter 4 at a small acute angle β makes it possible to process sections with small curvature radii and to move the cutting tool along a complicated (and precisely defined) profiled surface without deforming the billet's surface that has just been processed. The position of the cutter spindle at a small acute angle α (preferably about 5 degrees) in the frame's horizontal plane also contributes to this effect.

Milling cutter 4, having been properly shaped, is then attached to the cutter spindle 3 fixed in turn on the balancing unit 1 of the device. That follows the adjustment of the position of the axis of the spindle horizontally and vertically at angles of α and φ, respectively, as well as of course being parallel to the billet's axis.

The milling cutter's axis of rotation is turned at angle φ (preferably about 3–9 degrees) in the vertical plane, making it possible to produce deep cuts into the billet, this depth being as high as to the radius of the milling cutter minus the milling cutter's bearing body radius. Due to the relatively low profile of the milling cutter's teeth and the resulting great number of teeth on the cutter's circumference, the durability period of this multi-toothed cutting tool is very long. Due to fixing the cutter spindle in two orthogonal planes at small angles (α and φ) to the workpiece's axis and as a result of the counter-rotation of a billet and a specially shaped form-milling cutter, the cutter shaves off the billet with tops of its numerous turning sharp teeth. In the preferred embodiment, the speed of rotation for the cutter is at least 3 times more than the speed of rotation or the billet. Therefore, only the tips of the edges of the teeth facing the rough portion of the billet come into lateral contact with the billet at each moment in time. This ensures extremely low and essentially insignificant radial loads on a billet and a high level of smoothness in finished work surfaces. Also, the depth into the billet of the layer being cut does not depend on the milling cutter's teeth height. This allows for producing a long article in a single pass with high accuracy and smooth finish, all without a significant wear of the tool.

In operation, the billet 19 is first set between pinned guide head 30 (transferring torque from the shaft of the motor 31) and a passive head 32, with a crank 33 clamping the billet between the heads' centers using a screw gear. Motor 31 is used to rotate the billet 19 around the longitudinal axis and towards the rotating form-milling cutter 4.

The cutter spindle 3 is rotated by means of belt drive 5 from electric motor 6 placed on top of balancing unit 1. This belting drive allows adjustment of the cutter spindle 3 in the vertical plane at a desired angle φ ranging between 0 and 9 degrees and also horizontally at a desired angle α ranging from 0 to 9 degrees. The milling cutter's drive is maintained steady during cutting operations (for example, at preferred fixed angles of α and φ equal to about 5 degrees each).

The use of the belt drive makes it easy to adjust the parameters of cutting and to protect against extreme situations such as an unexpected increase in the working loads during processing, for example, in the situation where there is some heterogeneity in a billet.

For billets of soft wood, it is possible to use a cutter spindle 3 joined coaxially with the drive. Adjusting the cutter spindle's angles can be performed in a similar manner and even at a greater range of angles (to speed up processing), while extra measures should be taken to counterweight balancing unit 1 relative to the cylinder guide 2 in order to leave the center of gravity unchanged.

Balancing unit 1 is rotated relative to the cylinder guide 2 (the second degree of freedom), such radial movement allowing the depth of cutter into the billet to be adjusted as needed. The depth change is made accordingly to the position of the copier pin 13 relative to copier template 14, while moving the balancing unit lengthwise along cylinder guide 2 (the first degree of freedom). Counterweights 21 minimize the load on both the copier template and the copier pin, making a roller at the copier pin's end unnecessary and enabling the copier pin to be as thin as possible while still maintaining its rigidity. The fact that there is no roller on contact pin 13, but instead a specially sharpened flat form-milling cutter is used, allows to process billets with a very small curvature radii of profiled surfaces, as low as 1 mm.

The more acute the angle β of the cutter's teeth is set, the fewer the limitations on the maximum elevation angles of the copier pin relative to the copier template during processing billets. A more precise adjustment of counterweights may be required at copier sections with the maximum elevation angles of about 60 degrees.

A more exact adjustment of the multi-toothed cutting tool's position relative to the billet is performed by means of advancing the copier pin 13 with the help of a stop screw 12. A change in the initial position of the copier pin 13 results in the corresponding change in the initial position of multi-teeth cutting tool relative to the billet 19. When balancing unit 1 moves along the cylinder guide 2, the copier pin 13 slides along the copier template 14, adjusting the height of the teeth tops of the cutting tool 4 relative to the billet in the radial direction. The motion error doesn't exceed the copier pin curvature radius at its contact point with the copier. It may be necessary to adjust the position of copier pin 13 relative to copier template 14 (and accordingly the initial position of form-milling cutter 4 relative to the billet) while processing articles in one batch of uniform size. For example, this situation occurs if the cutter must be replaced or sharpened, and therefore there is a need to compensate for a different diameter cutter. Except when new, there is a natural variety of cutter diameters, depending on the number of times that it is sharpened.

Additional sharpening is done periodically by way of renewing triangle teeth edges on a grindstone, with further adjustment of teeth heights and sharpening done along a conic generator simultaneously.

The balancing unit 1 moves lengthwise along the cylinder guide 2 by the use of the chain 22, as powered through a reduction gear-box 23 and controlled by a release gear 24. The reduction gear 23 is rotated by the electric motor 25, which in turn is mounted on the frame 18. The motor is on until the end switch 26 is actuated, turning off electric motor 23 and then preferably switching off all the other electric motors. The end switch 26 is activated after the billet 19 has been processed along the intended length. Then, the balancing unit 1 is raised, the release gear 24 disengages the chain 22 and the balancing unit 1 is returned to its initial position (by hand cranking drum 27 with an attached rope); these operations can be operated manually or be mechanized and automated.

Smooth hand sanding with fine emery paper is possible before the billet is removed from the lathe, while only operating the motor 31 rotating the billet.

When the finished billet (machined and sanded) is taken off the lathe, another billet replaces it in the lathe and the processing cycle is repeated. The following changes are necessary when adjustments are made to accommodate machining a billet of harder material: slow down the balancing unit's speed of longitudinal motion along the billet, and reduce the angles ($\alpha$ and $\phi$) of the cutter spindle axis relative to the billet's axis.

While preparing the unique multi-teeth cutting tool according to the instant invention, standard milling cutter 2679-73 with the diameter of 100–120 mm may be used as a starting point; this milling cutter is commonly utilized in the metal-working industry in Russia. Its method of sharpening according to the instant invention does not require complex mechanisms. The milling cutter can be made starting from a common circular saw for wood.

The cutter 4 can be powered by a standard, preferably non-synchronous electric motor of up to 1.5 kW or more, and preferably the number of rotations per minute ranging from 1400 to 3600.

Utilization of the instant invention increases the productivity potential of multi-teeth wood processing tools. In particular, increase the longitudinal motion speed up to 300 mm per minute and more is possible, depending on the number of milling teeth of the cutter and the milling cutter revolution speed (as well as the rotation speed of the billet).

Although preferably wood, any material (such as metal, plastic and composite materials) may be utilized for billets. The billet must first be cut into square cross-section bars (such as 30×30 mm) and up to 1.5 meters or more in length. The minimum number of rejected finished articles is typically achieved if the ratio of the billet's length to its cross-section is less or equal to 30:1.

The advantages of the instant invention will make it possible to considerably lower the cost of mass production of round section articles with complicated profiled surfaces. The balancing unit 1 with a cutter spindle 4 as described above might be used as the basis to develop a series of multi-purpose woodworking machine tools.

The following are important inventive elements combined in the instant invention:

Design of a multi-teeth cutting tool with specially shaped teeth

Position of the milling cutter in a spindle that allows the unit to be placed at small acute angles to the axis of the cylinder guide and the corresponding deviations of the milling cutter's rotation plane perpendicular to the billet's rotation axis Balancing unit's design that allows to move the milling cutter lengthwise and radially in full accordance with the copier's form Usage of counterweights, which ensure precise adjustment of load distribution between a billet and a copier Possibility to adjust the device to the maximum diameter of the workpiece by way of replacing or transferring a copier template along the guides and to adjust the initial position of the copier pin.

Although the invention herein has been described with respect to particular embodiments, it is understood that these embodiments are merely illustrative of the principles and applications of the present invention. One example is the use of a cutter tool and the balancing unit of the invention to produce round articles or complicated profiles as dictated by a computer control. In that case a computer adjusts the position of the cutter next to a billet based on a preprogrammed path, similar to that of a commonly used CNC machines.

In another conceived alternative, the balancing unit with the cutter tool can be even moved by hand along the article to create complicated profiles on the billet.

It is therefore to be understood that numerous modifications may be made to the illustrative embodiments and that other arrangements may be devised without departing from the spirit and scope of the present invention as defined by the appended claims.

What is claimed is:

1. A lathe attachment device to produce a round section article with complicated surfaces, said device comprising:
   a multi-teeth beveled cutter, said cutter having a flat cutting side with the greatest diameter facing a rough portion of said article to be cut, each tooth of said cutter shaped in a generally triangular form and having cutting edge terminated in a pointed end along said cutting side of said cutter,
   a balancing unit having a cutter drive means adapted to rotate said cutter and hold it against said article in a predetermined position,
   a holding means to position said cutter so that its axis of rotation forms small acute angles to the axis of rotation of said article in both horizontal and vertical planes, said angles ranging between 3 and 9 degrees, and
   a moving means to draw said balancing unit along the article, whereby during the cutting process, said teeth each engage said rough portion of said article to be cut mostly laterally thereby significantly reducing the radial load on said article.

2. The device as in claim 1, wherein said cutter drive means adapted to rotate said cutter in a direction opposite to the rotation of said article, said cutter drive means rotating said cutter with a speed greater than the speed of rotation of said article.

3. The device as in claim 1, wherein said balancing unit further comprising a copier means adapted to move said cutter towards and away from said article in accordance with the shape of a template.

4. The device as in claim 3, wherein said copier means further comprising a copier pin resting directly against said template.

5. The device as in claim 1, wherein said angles are both set at about 5 degrees.

6. The device as in claim 1, wherein said balancing unit is further equipped with a counterweight.

7. The device as in claim 1, wherein each tooth having a top with a cross-section forming a triangle or a trapezoid in which one of the sides is perpendicular to the plane of said cutter and another forms an acute angle therewith.

8. The device as in claim 1, wherein said balancing unit having a center of gravity above said article.

9. The device as in claim 1 further equipped with attachment means to said lathe.

* * * * *